United States Patent [19]

Ryan

[11] 3,723,770

[45] Mar. 27, 1973

[54] CURRENT MODE MATCHED FILTER FOR DIGITAL DATA

[76] Inventor: Carl R. Ryan, 632 E. 7th Place, Mesa, Ariz. 85203

[22] Filed: Oct. 14, 1971

[21] Appl. No.: 189,238

[52] U.S. Cl. ..................307/256, 307/229, 307/317, 328/167

[51] Int. Cl. ..............................................H03k 17/74

[58] Field of Search ......307/317, 229, 256; 328/127, 328/165, 167

[56] References Cited

UNITED STATES PATENTS

| | | | |
|---|---|---|---|
| 2,251,973 | 8/1941 | Beale et al. | 328/127 |
| 2,723,355 | 11/1955 | Graham | 307/317 X |
| 3,141,098 | 7/1964 | Ravenhill et al. | 307/317 X |
| 3,231,823 | 7/1966 | Garfield et al. | 328/165 |
| 3,413,412 | 11/1968 | Townsend | 328/165 X |

OTHER PUBLICATIONS

Electronics, July 19, 1963 "Hot Carrier Diodes," by Krakauer et al. pp. 53–55.

*Primary Examiner*—John S. Heyman
*Attorney*—Foorman L. Mueller et al.

[57] ABSTRACT

A matched filter for use in a bit-by-bit digital detection circuit is shown including a pair of inductors through one of which current including signal and noise flows during a particular bit period. At the end of that bit period the circuit is interrupted by a hot carrier diode and the resulting voltage pulse having a particular polarity and magnitude is passed through a second hot carrier diode which is turned on when the first hot carrier diode is turned off. The second hot carrier diode is immediately turned off after the pulse transient has been threshold detected. At the time of turning off the first hot carrier diode and the current charge therein dumped, signal current flows in the second inductor by the turning on of a hot carrier diode. At the end of the second bit period, the integrated current in the second inductor is interrupted by a further diode switch is momentarily turned on and then off. The polarity and magnitude of the second transient pulse is converted into the proper data pulse and while the current charge in this inductor is being dumped, the first inductor is again on and is receiving the current for the third pulse. That is, there is no need for a zero interval between data pulses because the current of one inductor is being processed and dumped while the other inductor is being charged with the new data current and so on.

5 Claims, 5 Drawing Figures

CURRENT MODE MATCHED FILTER FOR DIGITAL DATA

BACKGROUND OF THE INVENTION

This invention relates to current mode matched filters for detecting digital data, more particularly to such matched filters being capable of operating in the range of speeds of five hundred million bits per second (500 MB/s), or higher, as well as operating at lower ranges such, for example, as twenty million bits per second (20 MB/s), and it is an object of the invention to provide an improved matched filter of this nature.

Heretofore, matched filters, also referred to in some cases as reset integrators, have operated in the voltage mode and were limited in their speeds to less than 20 MB/s even though solid-state components were used. In the voltage mode the integration took place across a capacitor and higher switching rates were limited, even if faster switching transistors were available, by parasitic phenomenon arising from the presence of unavoidable stray inductances.

It is a further object of the invention to obviate these defects of the prior art, to achieve improved matched filtering in detecting digital data by current integration at greatly reduced cost and with reduced complexity of equipment.

SUMMARY OF THE INVENTION

In carrying out the invention in one form, a current mode matched filter for detection of digital data is provided comprising signal input means; resistance means and inductance means connected in a series circuit and connected to said signal input means, said resistance means and inductance means having a time constant greater than two times the bit period of the digital data; solid-state first switching means in series with said series circuit for a current charging circuit for the inductance means; solid-state second switching means connecting said series circuit to a digital output circuit; and means for substantially simultaneously effecting opening of said first switching means and closing of said second switching means followed by opening said second switching means after a time interval substantially shorter than said bit period and closing said first switching means.

In carrying out the invention in another form, a current mode matched filter for detection of digital data consisting of transmitted logical one and logical zero data bits is provided comprising first and second inductive means; one pair of solid-state diodes connected to said first inductive means, one for completing a current circuit to said first inductive means corresponding to a logical one data bit and the other for completing a current circuit to said first inductive means corresponding to a logical zero data bit; a second pair of solid-state diodes connected to said second inductive means, one for completing a current circuit to said second inductive means corresponding to a logical one data bit and the other for completing a current circuit to said second inductive means corresponding to a logical zero data bit; voltage threshold detecting means for indicating logical one and logical zero data signals in response to corresponding logical one and logical zero input signals; a third pair of solid-state diodes connected to said first inductive means and to said voltage threshold detecting means; one for completing a circuit corresponding to a logical one data bit and the other for completing a circuit corresponding to a logical zero data bit; means for effecting transmission of turn-on and turn-off pulses alternately to said first and said second pairs of solid-state diodes at intervals of time equal to one bit period; means for effecting transmission of turn-on and turn-off pulses alternately to said second and third pairs of solid-state diodes at the end of each of said bit periods and for intervals of time equal to a relatively small fraction of a bit period, said third pair of solid-state diodes being turned on and off at the end of the turn-on bit period of said first pair of solid-state diodes and said fourth pair of diodes being turned on and off at the end of the turn-on bit period of said second pair of solid-state diodes; means for receiving and holding said data pulses from said threshold detecting means; clock means for supplying timing pulses to said means for transmitting turn-on and turn-off pulses and to said receiving and holding means; and said clock pulses effecting synchronous on and off operation of said first, second and third, fourth pairs of solid-state diodes and effecting readout of the digital pulses in said receiving and holding means.

DESCRIPTION OF THE PREFERRED EMBODIMENTS

Figure 1:
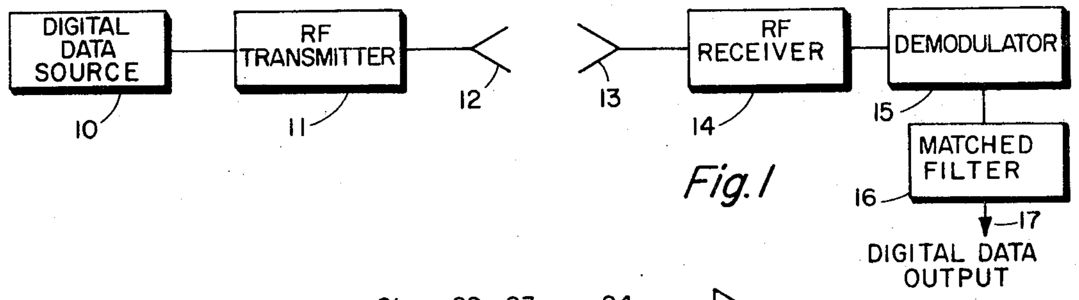
FIG. 1 is a block diagram of a transmitting and receiving system embodying a matched filter according to the invention.

Referring to the drawings a system in which the invention is employed is illustrated in FIG. 1 as comprising a digital data source 10, an RF transmitter 11, a transmitting antenna 12, a receiving antenna 13, an RF receiver 14, a demodulator 15, a matched filter 16, and a digital data output illustrated by the arrowhead 17.

The digital data generated by the source 10 and transmitted by the transmitter 11 may consist of a succession of logical ones ("1") and zeros ("0") as shown by FIG. 5B, which also shows the logical ones and logical zeros which are to be reproduced in the receiving apparatus. It will be understood that a logical one may be represented by a voltage at one state, for example, 5 volts, and a logical zero may be represented by a lower voltage of some value, for example, 0 volts, 1 volt, or −5 volts or some other value.

While the digital data as transmitted and as ultimately defined by the receiver including the matched filter is free of noise, according to the invention, is free of noise the signal in transmission between antennas 12 and 13 picks up a certain amount of noise. Hence, the composite signal as received by antenna 13 consists of a signal-plus noise as shown in FIG. 5A, the noise being represented by the zig-zag line. To obtain a well defined digital signal it is essential that the noise component be eliminated or minimized and that the data portion of the signal be fully reconstructed or maximized. Thus a filter matched to the signal characteristics must be used for optimum reconstruction of the transmitted signal. In the case of bit-by-bit digital detection, this amounts to an integration of the signal during one bit period, followed by threshold detection at the end of the integration period.

For a high-speed digital communication link, as illustrated in FIG. 1, a form of matched filter, such as according to the invention, is essential. Otherwise the digital signal as ultimately existing at the digital data output 17 is subject to a large degree of error. While different types of reset integrators are known and perform to a limited extent the function of a matched filter, most use the voltage mode and are limited to speeds of less than 20 MB/s. According to the invention, 200 MB/s have been achieved with less than 0.5 dB degradation with reduced complexity of circuitry, and with circuitry which is easy to build. Moreover improved speeds beyond 500 MB/s are possible.

Figure 2:
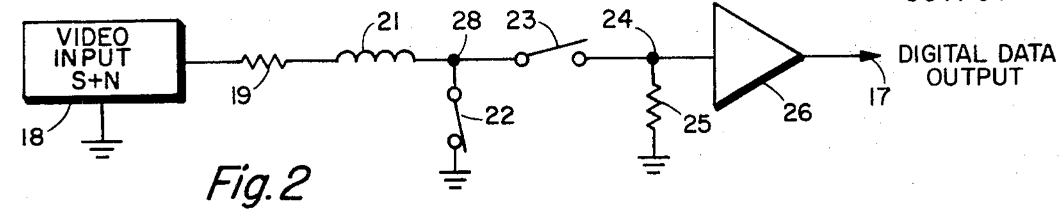
FIG. 2 is a simplified schematic diagram of a receiving system illustrating the invention.

A circuit according to the invention developed to perform the integration function at the high speeds required is shown in simplified form in FIG. 2. In this figure the video input S+N (signal + noise) 18 comprises the components 14 and 15 of FIG. 1 and any other components, not shown, which may be necessary in the receiver equipment as is well understood. For example some form of synchronizing pulse as between the transmitter and receiver may be needed but forms no part of the subject invention.

The digital signals as transmitted are represented in FIG. 5B as occurring between time intervals, $T_0$—$T_1$ to $T_6$—$T_7$ and so on. These signals are shown as square wave pulses. But when received at the antenna 13 and shown in the block 18 labelled "Video Input S+N", the signal has acquired an increment of noise and may be represented diagrammatically by the waveforms in FIG. 5A for the same time intervals $T_0$—$T_1$ to $T_6$—$T_7$. Briefly stated, the problem is to eliminate the noise component shown by the zig-zags in FIG. 5A.

In FIG. 2, the matched filter comprises the resistor 19 which typically may be about 10 ohms, the inductor 21 which typically for the speeds of operation desired may be about one-tenth of a microhenry, the switch 22 shown closed, the switch 23 shown open, and the resistor 24. The switches 22 and 23, as will become clear, in the preferred form are fast-acting solid-state devices. The junction 24 of one terminal of switch 23 and the resistor 25, is shown feeding into an amplifier 26 from which the digital data output 17 appears. The video input 18, the switch 22 and the resistor 25 are shown connected to ground in order to form complete circuits.

During any bit time which, for example, may be 5 nanoseconds at the 200 MB/s rate, which is also the bit integration time, $T_0$—$T_1$, for example, the signal plus noise voltage, as shown in FIG. 5A, is applied to the resistor 19, the inductor 21 and the closed switch 22 to ground. The switch 23 is open under these conditions. The current flowing through the resistor 19 and inductor 21 is shown by the rising current curve 27 between $T_0$ and $T_1$ in FIG. 5C. That is to say, the inductor 21 is becoming charged with current which in effect is the integral of the current $i(t)$ during this time interval. The shape of the current 27 is that normally obtained when an inductor and a resistor in series has a voltage applied to it. The current in the inductor 21 $i(t)$ is proportional to the integral of the input signal S+N between $T_0$ and $T_1$, the bit time interval if the time constant of the LR circuit is greater than two times the bit period.

At the end of the bit period, the switch 22 is opened and simultaneously the switch 23 is closed as will be subsequently described and after a very short time interval, for example, about one-tenth of the bit period, the switch 23 is again opened. But while the switch 22 is open and the switch 23 is closed an inductive kick, or transient voltage, is obtained at point 28 as is well understood. This transient voltage appears at the input of amplifier 26 which amplifies the voltage pulse and supplies it to the digital data output circuitry 17. The energy in the inductive voltage pulse is proportional to the current at the bit termination time, $T_1$, which is amplified and stretched as will be described for threshold detection. The voltage pulse obtained as a result of current wave 27 at the time $T_1$ has a magnitude and polarity such that a logical "1" voltage is determined as the signal input less the noise between the time interval $T_0$ and $T_1$.

It is not necessary to know whether there is a large inductive kick, or not, when the switch 22 is open. It is desired only that the current through the inductor 21, when switch 22 is opened, is roughly proportional to the integral of the current during this period and it is sufficient to known whether the resulting pulse is positive or negative because in the event that it is positive a logical "1" may be the output digital data and if negative, a logical "0" may be the digital output data.

Figure 5:
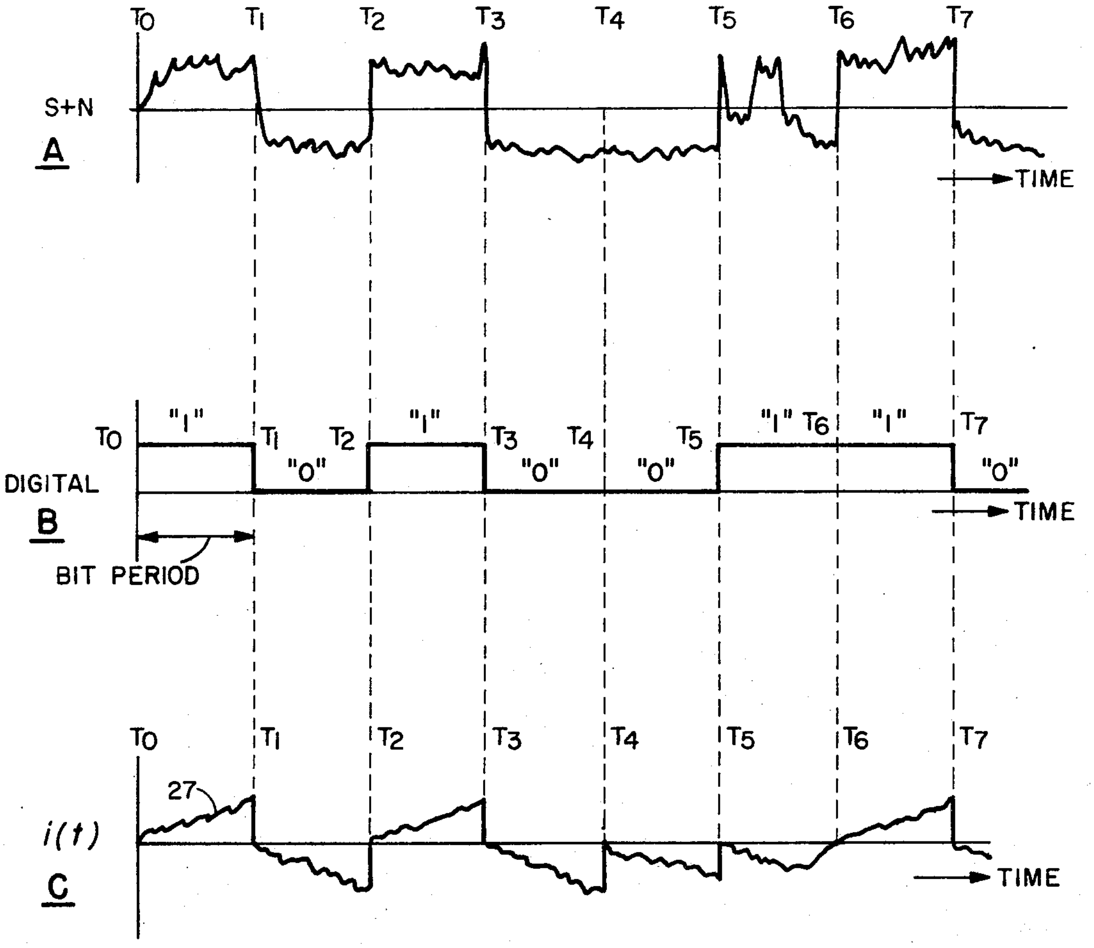
FIGS. 5 (A, B and C) are schematic waveforms useful in explaining operation of the invention.

The time necessary for the amplifier 26 to receive and amplify the voltage pulse may be very short, but this time may be stretched as will be described. After about one-tenth of a bit time, as indicated, the switch 23 opens and the switch 22 closes thus permitting the current to again flow during the second time interval or bit period, $T_1$—$T_2$. As shown in FIGS. 5A, 5B and 5C, the pulse transmitted during the time interval $T_1$—$T_2$ is such that the inductor 21 is charged with a negative-going current thus giving a logical "0" output at the end of $T_2$ of the integrating or bit period. Similar steps occur throughout the successive intervals illustrated in FIG. 5 from $T_0$ to $T_7$. As indicated in these figures, logical "1"s and logical "0"s may appear in any order successively.

The resistor 25 is shown connected to ground from the input of amplifier 26 in order to provide a finite load impedance to the amplifier. This resistor absorbs some of the pulse which appears when switch 22 opens and switch 23 closes and thus tends to diminish the amplitude of the voltage pulse. To this extent, improved operation might be obtained if the resistor 24 were eliminated but operability of the amplifier 26 is improved when there is a finite and known load impedance to ground at its input.

Figure 3:
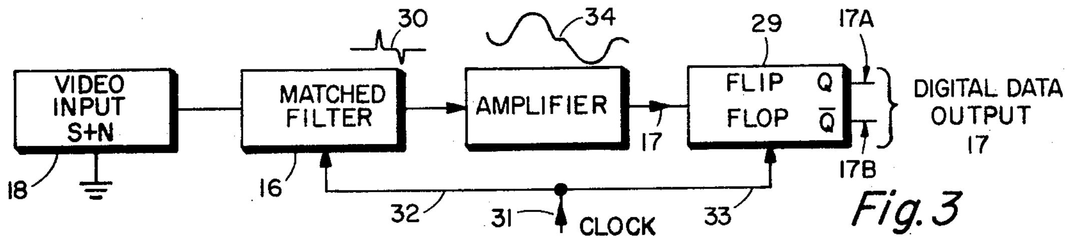
FIG. 3 is a block diagram of a receiving system illustrating certain additional components.

In FIG. 3 a block diagram corresponding to the components of FIG. 2 is shown, but there is added the flip-flop 29 which may be of any conventional type having a sufficiently fast operating time. Also added is a clock or timing device 31, shown diagrammatically, for supplying timing pulses to the matched filter 16 through a conductor 32 and a readout or command pulse to flip-flop 29 through a conductor 33. Shown diagrammatically adjacent the output of matched filter 16 are positive and negative voltage pulses 30 which are the pulses received by the amplifier 26 when the switch 22 is opened and the switch 23 is closed. They are also, ultimately, the logical "1" and logical "0" of the received data. Pulses of this small magnitude and time duration are taken by the amplifier 26 and other circuitry to be described and stretched out as well as amplified to provide a waveform shown by the reference character 34. The positive and negative-going wave shapes 34 have sufficient amplitude and time duration to cause the flip-flop 29 to change its data input when these pulses are received from the amplifier. The digital data output 17 may be provided over the conductors 17A and 17B to whatever utilization circuit is desired. The flip-flop 29 must have a sufficiently fast operating time in order to accommodate data speeds of the order of 20 to 500 MB/s.

Figure 4:
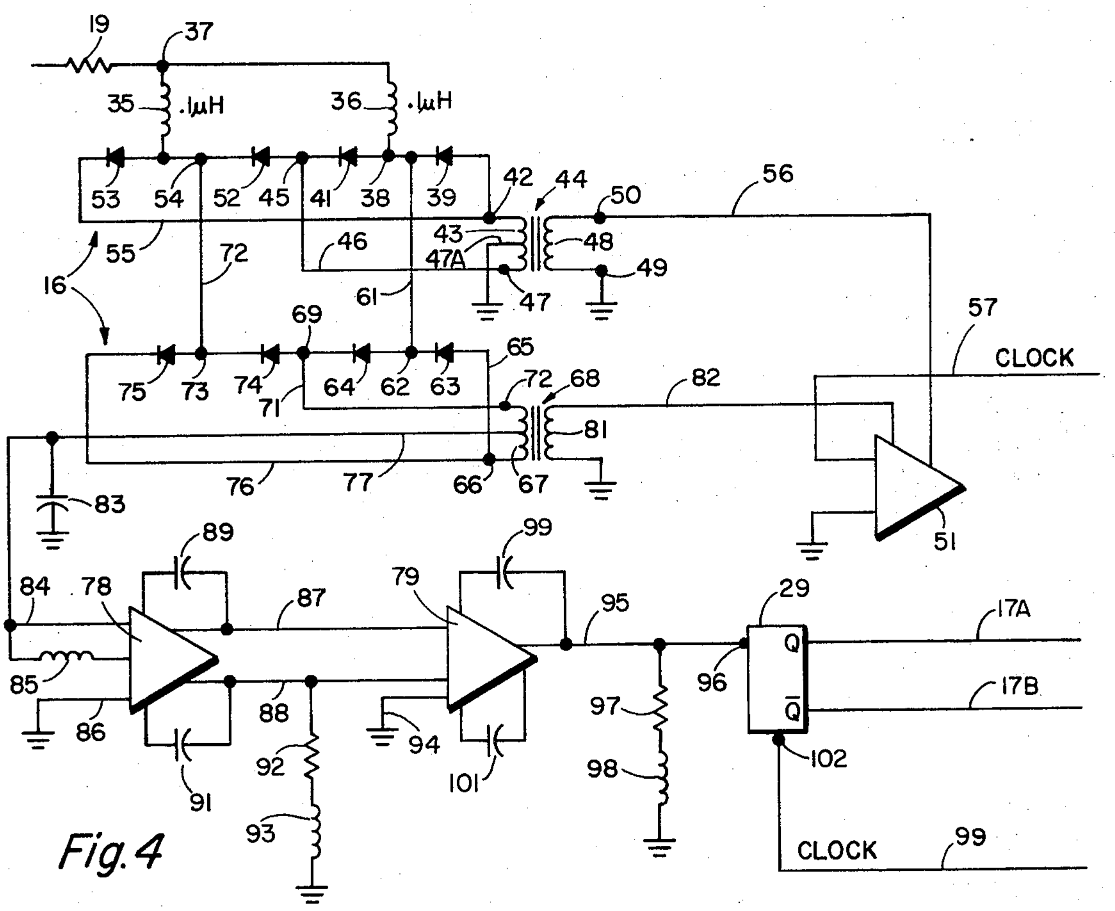
FIG. 4 is a circuit diagram of the matched filter and certain other components illustrated in FIG. 3.

FIG. 4 represents schematically an operating circuit as actually used, and to the extent possible the same reference characters will be used on this figure as are used in the preceding figures. One of the principle differences in FIG. 4 over that of the preceding figures is the more complete showing of the matched filter 16 in order that faster and more improved operation is obtained. It is intended in this circuit to handle the incoming data pulses which follow hard on the heels of each other and do not provide for any zero interval between one data pulse and the other.

To achieve this adequately, in the operating circuit, two inductors 35 and 36 connected together at one terminal 37 to which is connected the resistor 19 are provided. As will become clear, when one of the inductors, for example, 36, is being charged with current in order to develop one data pulse, the other inductor 35, for example, is being discharged, or dumped, and thus there is no time delay as between equipment readiness to receive data pulses. When the inductor 36 has its current in the process of detection by the circuitry to be described, the inductor 25 is automatically in the circuit for receiving the data for the next succeeding pulse.

The resistor 19, while shown as a single component, is representative of the composite resistance in the preceding circuit consisting of a video amplifier which serves as a buffer circuit between the demodulator and the matched filter. Referring to FIG. 5, the function of the parallel connected inductors 35 and 36 may be further understood. Thus, for example, while the current in inductor 36 is being threshold detected at the time $T_1$ for the first data pulse, the inductor 36 is disconnected from the input circuit, but the inductor 35 is connected to the input circuit, and immediately begins to receive the signal represented by the time interval between $T_1$ and $T_2$. For subsequent time or bit intervals, the same phenomenon takes place.

The terminal 38 of the inductor 36 corresponds essentially to the terminal 28 of FIG. 2, and inductor 36 corresponds, for successive data pulses, to inductor 21. The terminal 38 is connected between the cathode and anodes of diodes 39 and 41, the anode of diode 39 being connected to the terminal 42 of the secondary winding 43 of transformer 44 and the cathode of diode 41 is connected through terminal 45 and conductor 46 to the other terminal 47 of the secondary 43 transformer 44. The secondary of winding 43 of transformer 44 has a center tap 47A which is grounded as shown. The primary winding 48 of transformer 44 has one terminal 49 connected to ground as shown and has the other terminal 50 connected to one of the output terminals of amplifier 51.

Similarly the inductor 35 is connected between the cathode and anode of diodes 52 and 53, the anode of diode 52 is connected to terminal 45 and conductor 46 to the terminal 47 of the secondary winding of transformer 44. The cathode of diode 53 is connected by means of a conductor 55 to the terminal 42 of the transformer secondary 43. The diodes 38, 39, 52 and 53 may be of the hot carrier or Schottky barrier type having fast operating or switching times, for example, in the area of one-tenth of a nanosecond. These diodes in operation correspond to the operation of switch 22 of FIG. 2, diodes 38 and 39 functioning in this manner for inductor 36, and diodes 52 and 53 functioning in this manner for inductor 35. Suitable biasing arrangements may be provided for the diodes 38, 39, 52 and 53 if desired, and may be conventional in nature and for that reason are not shown in this figure.

The turn-on voltage pulses to the diodes are supplied through the secondary 43 of transformer 44, the secondary being inductively energized from the primary 48 through a conductor 56 extending from one terminal of amplifier 51. The timing pulses for energizing the turn-on and turn-off pulses are supplied by any suitable well known clock designated by the conductor 57 connected to one of the inputs of amplifier 51. The two diodes poled in the same direction are connected to the terminal 38 of inductor 36 and the two diodes also similarly poled are connected at their juncture 54 to the output of inductor 35. In this manner the current flowing in each of the inductors may be positive-going or negative-going and thus means are provided in this circuit for the detecting logical signals corresponding to logical "1"s as well as logical "0"s for each inductor.

The terminal 38 of inductor 36 is connected by means of conductor 61 to a terminal 62 between the cathode and anode respectively of diodes 63 and 64, the anode of diode 63 being connected through conductor 65 to the terminal 66 of the secondary winding 67 of transformer 68. The cathode of diode 64 is connected to terminal 69 which is connected through conductor 71 to the terminal 70 of secondary winding 67. The terminal 54 of inductor 35 is connected through conductor 72 to terminal 73 between diodes 74 and 75. The anode of diode 74 is connected to terminal 69 and thus to terminal 72 of primary winding 67, and the cathode of diode 75 is connected through conductor 76 to terminal 66 of the secondary winding 67. The transformer secondary 67 supplies turn-on and turn-off voltages for the diodes 63, 64, 74 and 75 as will be explained, the diodes having suitable bias supplied thereto, if necessary, as will be well understood, is not necessary to an understanding of the circuit, and is not illustrated in this circuit. The secondary winding 67 has a center tap connected through conductor 77 to an amplifier 78 forming one stage of a two-stage amplifier, the other stage of which may be designated by the reference character 79.

The diodes 63 and 64 which also may be of the hot carrier, or Schottky barrier, type are associated with inductor 36 in order that both positive and negative pulses of current may be accommodated for achieving logical "1"s as well as logical "0"s depending upon the polarity of current through inductor 36. Similarly diodes 74 and 75 may be of the hot carrier, or Schottky barrier, type are poled as shown and are associated with inductor 35 in order that positive and negative-going currents may be accommodated whereby data of either logical "1" or logical "0" type data may be obtained by and through inductor 35. The turn-on and turn-off pulses to diodes 63, 64, 74 and 75 are supplied through the secondary winding 67 inductively from the primary winding 81 of transformer 68. The input to the primary 81 is supplied through a conductor 82 from a second output of amplifier 51 in response to a clock pulse received over conductor 57. The diodes 63, 64, 74 and 75 function in the manner of switch 23 of FIG. 2 and have switching times of the order of one-tenth of a nanosecond as described in connection with the diodes 38, 39, 52 and 53.

The output pulses from diodes 63, 64, 74 and 75 through conductor 77 are of the low amplitude and short time interval variety as shown by 30 in FIG. 3 and thus the capacitor 83 shown connected to ground stretches the pulses out as shown by the reference character 34 in FIG. 3. The pulses over conductor 77 enter the first stage 78 of the amplifier through a conductor 84 and an inductor 85, the other input terminal of the amplifier being shown grounded through conductor 86. The output pulses of amplifier stage 78 appear on conductors 87 and 88 with feedback capacitors 89 and 91 being connected as shown. The conductor 88 is shown grounded through a resistor 92 and an inductor 93. The components 85, 89, 91, 92 and 93 are essentially conventional arrangements in amplifier circuits of this type having a high gain such as 20 dB and a bandwidth of about 200 megacycles, and the components improve the bandwidth performance and other operations of the amplifier as is well understood. The outputs of amplifier stage 78 passing through conductors 87 and 89 enter the amplifying stage 79, the other input terminals of this amplifier stage being connected to ground through conductor 94. The output of amplifier stage 79 passes through a conductor 95 to the data input terminal 96 of flip-flop 29. Conductor 95 is connected to ground through a resistor 97 and an inductor 98, and feedback capacitances 99 and 101 are connected as shown for high gain and improved operation of the amplifying stage 79.

The output pulse appearing on conductor 95 would have the stretched and amplified appearance as indicated by the reference character 34 in FIG. 3 and as applied to input data terminal 96 of flip-flop 29 has sufficient amplitude and time interval to hold the data pulse whether a logical "0" or logical "1" at this point. The clock supplying a pulse appearing on line 57 (line 32 of FIG. 3) provides a similar pulse over line 101 and goes to another input terminal 102 or clocking input of flip-flop 29. As the data pulse, either to be a logical "1" or logical "0", sits at terminal 96, it will appear at terminal Q of flip-flop 29 as a logical "1", if such is the data. When a clock pulse appears at terminal 102, a logical "0" of course appears at terminal $\bar{Q}$. Similarly when a logical "0" data sits at input terminal 96 and a clock pulse is received over conductor 99, a logical "0" appears at terminal Q and a logical "1" appears at terminal $\bar{Q}$.

The clock pulses appearing over conductor 99 will be 200 megaHertz for a 200 bit per second data interval.

The functioning of the circuit of FIG. 4 may now be described: As a clock pulse is received over conductor 57, a square wave positive pulse, for example, is supplied over the conductor 56 to the primary 48 of transformer 43. This square wave pulse, having a time duration of one bit period, functions through transformer 44 which has a sufficient bandwidth for the purpose, to bias diodes 38 and 39 on, diodes 52 and 53 remaining off. The current available on the input including signal plus noise flows through resistor 19 and inductor 37, and through whichever one of the diodes 39 and 41 is poled for the input signal that has been transmitted. If this should be diode 41 and the data corresponds to a logical "1", the current through inductor 36 will rise as shown by the reference character 27 in FIG. 5. The other diode 39 will remain nonconducting at least to the end of the bit period, that is, at $T_1$. If, on the other hand, the data should correspond to a logical "0", the current through inductor 36 would fall.

The clock pulse over conductor 57 provides a negative half of the square wave to conductor 56 thereby turning off the diodes 39 and 41, and momentarily turning on the diodes 63 and 64 through conductor 82 which receives a pulse having a bandwidth of about one-tenth of a bit period as described. When the diodes 38 and 39 are turned off, an inductive pulse transient is developed which passes over conductor 61 to terminal 62 and through whichever one of the diodes 63 and 64 is conducting depending upon the data corresponding to a logical "1" or logical "0". The data pulse is then transmitted through the circuit including conductor 77 and the amplifier stages 78 and 79, and develops a logical "1" data pulse which appears at terminal 96. At this same time $T_1$, the clock supplies a readout pulse over conductor 99 and the data pulse at terminal 96 appears as a logical "1" on the Q terminal of the flip-flop.

When the diodes 39 and 41 were turned off by the clock pulse over conductor 56, the negative square wave pulse of the transformer 48 immediately turns on the diodes 52 and 53 and permits the transmitted data to develop a current through inductor 35 which may be indicative of a logical "1" or logical "0". Then at the end of the next bit period, that is, $T_2$, the clock pulse appearing over line 57 and hence on line 56 turns off the diodes 52 and 53. The corresponding timing pulse appearing on conductor 82 turns diodes 74 and 75 on and thus the voltage transient developed by virtue of interrupting the current in inductor 35 appears at terminal 73 and passes through the appropriate one of diodes 74 and 75. It thus passes through conductor 77 to the amplifying stages 78 and 79, and appears as a data signal at terminal 96 of the flip-flop 29. This may also correspond to either a logical "1" or a logical "0". If it corresponds to a logical "0", the current in inductor 35 would fall as shown by waveform 27A of FIG. 5C. This may also correspond to either a logical "1" or a logical "0". The diodes 74 and 75 were on only momentarily, for example, one-tenth of a bit period as determined by the clock pulse appearing over conductor 82, the bandwidth of the transformer 81 being sufficient for this purpose. At the same time a clock pulse appears on conductor 99 and thus to terminal 102 of the flip-flop. This causes the logical "1" or "0" data signal existing at terminal 96 to read out and be supplied to the utilization circuit. If the data corresponds to a logical "0", such will appear at the terminal Q. Of course a logical "1" appears at terminal $\bar{Q}$. The reverse would be the case if the input data corresponded to a logical "1".

Thus, as described, the input data signals, whether corresponding to logical "1"s or logical "0"s, are received continuously, that is, hard on the heels of each other and while one of the data pulses is being processed by the circuitry following inductor 36 to read out, the succeeding data pulse is being transmitted through the inductor 35 in anticipation of being processed and read out as soon as the processing of the data signal in inductor 36 is complete. In this manner there does not need to be a period of zero signal between data signals during the transmission process.

Referring to FIG. 5 there is shown between the time intervals $T_4$ and $T_6$ a situation where the noise added to the signal renders ambiguous the signal plus noise input. Nevertheless the structure as described will take the signal plus noise inputs and will integrate them and supply a logical "1" or logical "0" at the output. Depending upon the amount of noise in the incoming signal, some error may be anticipated. Such error will be small and ignorable in most instances.

Typical values of the various circuit components are:

R(19) — 10 Ω
R(92) — 50 Ω
R(97) — 50 Ω
L(21), (35) and (36) — 0.1 μh
L(85) — 0.01 μh
L(93) — 0.01 μh
L(98) — 0.01 μh
C(83) — 5 pf
C(89) — 0.1 μf
C(91) — 0.1 μf
C(99) — 0.1 μf
C(101) — 0.1 μf The circuit shown is exemplary and other circuits and other component values may be utilized for particular circumstances.

What is claimed is:

1. A current mode matched filter for detection of digital data consisting of transmitted logical one and logical zero data bits comprising:

first and second inductive means;

one pair of solid-state diodes connected to said first inductive means, one for completing a current circuit to said first inductive means corresponding to a logical one data bit and the other for completing a current circuit to said first inductive means corresponding to a logical zero data bit;

a second pair of solid-state diodes connected to said second inductive means, one for completing a current circuit to said second inductive means corresponding to a logical one data bit and the other for completing a current to said second inductive means corresponding to a logical zero data bit;

voltage threshold detecting means for indicating logical one and logical zero data signals in response to corresponding logical one and logical zero input signals;

a third pair of solid-state diodes connected to said first inductive means and to said voltage threshold detecting means, one for completing a circuit corresponding to a logical one data bit and the other for completing a circuit corresponding to a logical zero data bit;

means for effecting transmission of turn-on and turn-off pulses alternately to said first and said second pairs of solid-state diodes at intervals of time equal to one bit period;

means for effecting transmission of turn-on and turn-off pulses alternately to said second and third pairs of solid-state diodes at the end of each of said bit periods and for intervals of time equal to a relatively small fraction of a bit period, said third pair of solid-state diodes being turned on and off at the end of the turn-on bit period of said first pair of solid-state diodes and said fourth pair of diodes being turned on and off at the end of the turn-on bit period of said second pair of solid-state diodes;

means for receiving and holding said data pulses from said threshold detecting means;

clock means for supplying timing pulses to said means for transmitting turn-on and turn-off pulses and to said receiving and holding means; and said clock pulses effecting synchronous on and off operation of said first, second and third, fourth pairs of solid-state diodes and effecting readout of the digital pulses in said receiving and holding means.

2. The circuit according to claim 1 wherein the turn-on time of said third and fourth pairs of solid-state diodes is of the order of one-tenth of a bit period.

3. The circuit according to claim 1 wherein all of said diodes comprise hot carrier diodes.

4. The circuit according to claim 1 including resistance means in series with said inductive means providing a time constant greater than two times the bit period of the digital data.

5. The circuit according to claim 1 having an operating speed in the range of twenty mega bits per second to five hundred mega bits per second.

* * * * *